United States Patent
Lin

(10) Patent No.: US 6,837,440 B2
(45) Date of Patent: Jan. 4, 2005

(54) CONTACTLESS AND INTELLIGENCE-WISE CODE IDENTIFICATION CHIP SYSTEM

(75) Inventor: Chun-Ping Lin, HsinChu (TW)

(73) Assignee: Winbond Electronics Corp (TW)

( * ) Notice: Subject to any disclaimer, the term of this patent is extended or adjusted under 35 U.S.C. 154(b) by 0 days.

(21) Appl. No.: 10/439,352

(22) Filed: May 15, 2003

(65) Prior Publication Data

US 2004/0065730 A1 Apr. 8, 2004

(30) Foreign Application Priority Data

Oct. 3, 2002 (TW) .......................................... 91122910 A

(51) Int. Cl.[7] .............................................. G06K 19/06
(52) U.S. Cl. ........................ 235/492; 235/380; 235/382; 235/384
(58) Field of Search ................................ 235/492–493, 235/375, 380, 449, 451, 487, 488; 455/3.01–3.05; 340/10.1–10.4

(56) References Cited

U.S. PATENT DOCUMENTS

| | | | | |
|---|---|---|---|---|
| 4,754,319 A | * | 6/1988 | Saito et al. .................. | 257/679 |
| 4,974,193 A | * | 11/1990 | Beutelspacher et al. .... | 713/200 |
| 5,293,029 A | * | 3/1994 | Iijima .......................... | 235/380 |
| 5,418,353 A | * | 5/1995 | Katayama et al. .......... | 235/380 |
| 5,581,708 A | * | 12/1996 | Iijima ........................... | 710/11 |
| 5,627,894 A | * | 5/1997 | Albert et al. .................. | 380/46 |
| 6,040,786 A | * | 3/2000 | Fujioka ..................... | 340/928 |
| 6,354,500 B1 | * | 3/2002 | Gercekci et al. ............. | 235/451 |
| 6,422,473 B1 | * | 7/2002 | Ikefuji et al. ................ | 235/492 |
| 6,433,689 B1 | * | 8/2002 | Hovind et al. ........... | 340/573.1 |
| 6,588,672 B1 | * | 7/2003 | Usami ......................... | 235/492 |
| 6,600,899 B1 | * | 7/2003 | Radomsky et al. ........ | 455/3.05 |
| 2002/0046226 A1 | * | 4/2002 | Nakabe et al. .............. | 708/250 |
| 2004/0178274 A1 | * | 9/2004 | Wu et al. .................... | 235/491 |

FOREIGN PATENT DOCUMENTS

| | | | | |
|---|---|---|---|---|
| EP | 0138386 | * | 4/1985 | ............. G07F/7/10 |
| JP | 10291392 | * | 11/1998 | .......... G06K/19/77 |
| JP | 2001195551 | * | 7/2001 | .......... G06K/17/00 |

* cited by examiner

*Primary Examiner*—Karl D. Frech
*Assistant Examiner*—Edwyn Labaze
(74) *Attorney, Agent, or Firm*—Squire, Sanders & Dempsey LLP

(57) ABSTRACT

The present invention provides a kind of contactless and intelligence-wise code identification chip system. The contactless and intelligence-wise code identification chips have an identification code respectively. The chips can generate a random number to select one of time slots for allocating said identification code. The contactless and intelligence-wise code reader can read the identification code from time slots by the polling method.

14 Claims, 2 Drawing Sheets

CONTACTLESS AND INTELLIGENCE-WISE CODE IDENTIFICATION CHIP SYSTEM

PRIORITY REFERENCE TO PRIOR APPLICATION

This application claims benefit of Taiwanese patent application serial number 091122910, entitled "Contactless and Intelligence-Wise Code Identification Chip System," filed on Oct. 3, 2002, by inventor Chun-Ping Lin.

FIELD OF THE INVENTION

The present invention is relative to a contactless and intelligence-wise code identification chip system, especially for the system that transfers the identification code by the time slots.

BACKGROUND OF THE INVENTION

General identification codes are stored in the magnetic cards, and every card has one identification code. When a magnetic card is rushed through a card reader, the card reader could be able to identify the card user by the identification code stored in the card. But it is inconvenient for a user to take a card and rush through the card reader for identifying. So, a contactless identification code system is developed to improve the drawback of the conventional magnetic cards. The Contactless identification code system is able to identify the identification code by induction coil 12 in the card reader 11 i s able to produce a magnetic field. There is a contactless identification code IC 14 and an induction coil 15 in the card 13. An identification code is also set in this card. When the card 13 closes to the code reader, the induction coil 15 will be coupled and provides the electric power of the IC 14 according to the electromagnetic induction theory. Then the code stored in the IC will passes to the card reader 11 to identify. So, by closing the card, the card reader, but not rushing through it, can identify a user's code.

The prior art is designed for identifying one card every time. If several cards are taken close to the code reader for identifying concurrently, then the ID collision will be happened and the code identification would be wrong. Therefore, the prior art can't apply to the card identification toys or supermarket clerks for identifying several same or different items concurrently.

SUMMARY OF THE INVENTION

The main object of present invention is to provide a contactless and intelligence-wise code identification chip system for identifying the identification codes one by one in several code chips. And the ID collision will not happen to make the code identification fail even though these code chips with the same code. The accuracy of code identification almost can be 100%, so we can apply the contactless and intelligence-wise code identification chip system to the card identification toys or supermarket clerks to identify several same or different items concurrently.

BRIEF DESCRIPTION OF THE INVENTION

According to the present invention, a contactless and intelligence-wise code identification chip system for transferring an identification code by a plurality of time slots. The plurality of chips include the identification code and are able to generate random numbers. The random number is used to select one of the time slots for allocating the identification code. And, the contactless and intelligence-wise code reader can read the identification code from the plurality of time slots by a polling method.

In accordance with one aspect of the present invention, the contactless and intelligence-wise code identification chip is induced by a magnetic field energy, and transfers the identification code to the contactless and intelligence-wise code reader.

In accordance with one aspect of the present invention, the random number is an integer among 0 to N, and N is an integer larger than 1.

In accordance with one aspect of the present invention, an interval of the time slot is 2 ms.

In accordance with one aspect of the present invention, the contactless and intelligence-wise code reader reads the identification code from the plurality of time slots by the polling method at least once.

In accordance with one aspect of the present invention, the contactless and intelligence-wise code reader also includes a memory unit to record the time slot and the identification code.

In accordance with one aspect of the present invention, the contactless and intelligence-wise code reader also includes an output unit to output a content of the memory unit.

According to the present invention, the method provides a plurality of contactless and intelligence-wise code identification chips to transfer an identification code by a plurality of time slots, and comprising steps of:

Generate a random number by the contactless and intelligence-wise code identification chip, the random number being used to select one of time slots for allocating the identification code; and Read the identification code from the plurality of time slots by the contactless code reader with a polling method.

In accordance with one aspect of the present invention, the contactless and intelligence-wise code identification chip is induced by a magnetic field energy, and transfers the identification code to the contactless and intelligence-wise code reader.

In accordance with one aspect of the present invention, the random number is an integer among 0 to N, and N is an integer larger than 1.

In accordance with one aspect of the present invention, the interval of the time slot is 2 ms.

In accordance with one aspect of the present invention, the contactless and intelligence-wise code reader reads the identification code from the plurality of time slots by the polling method at least once.

In accordance with one aspect of the present invention, the contactless and intelligence-wise code reader also includes a memory unit to record the time slot and the identification code.

In accordance with one aspect of the present invention, the contactless and intelligence-wise code reader also includes an output unit to output the content of the memory unit.

The present invention may best be understood through the following description with reference to the accompanying drawings, in which:

DETAILED DESCRIPTION OF THE PREFERRED EMBODIMENT

Figure 1:
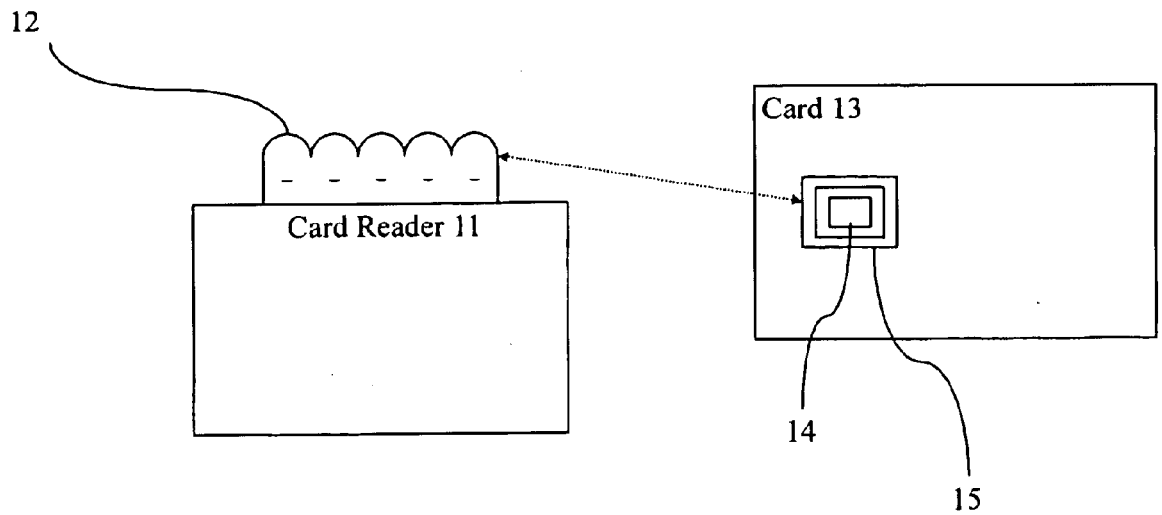
FIG. 1 shows the block diagram of prior contactless code identification system.
Figure 2:
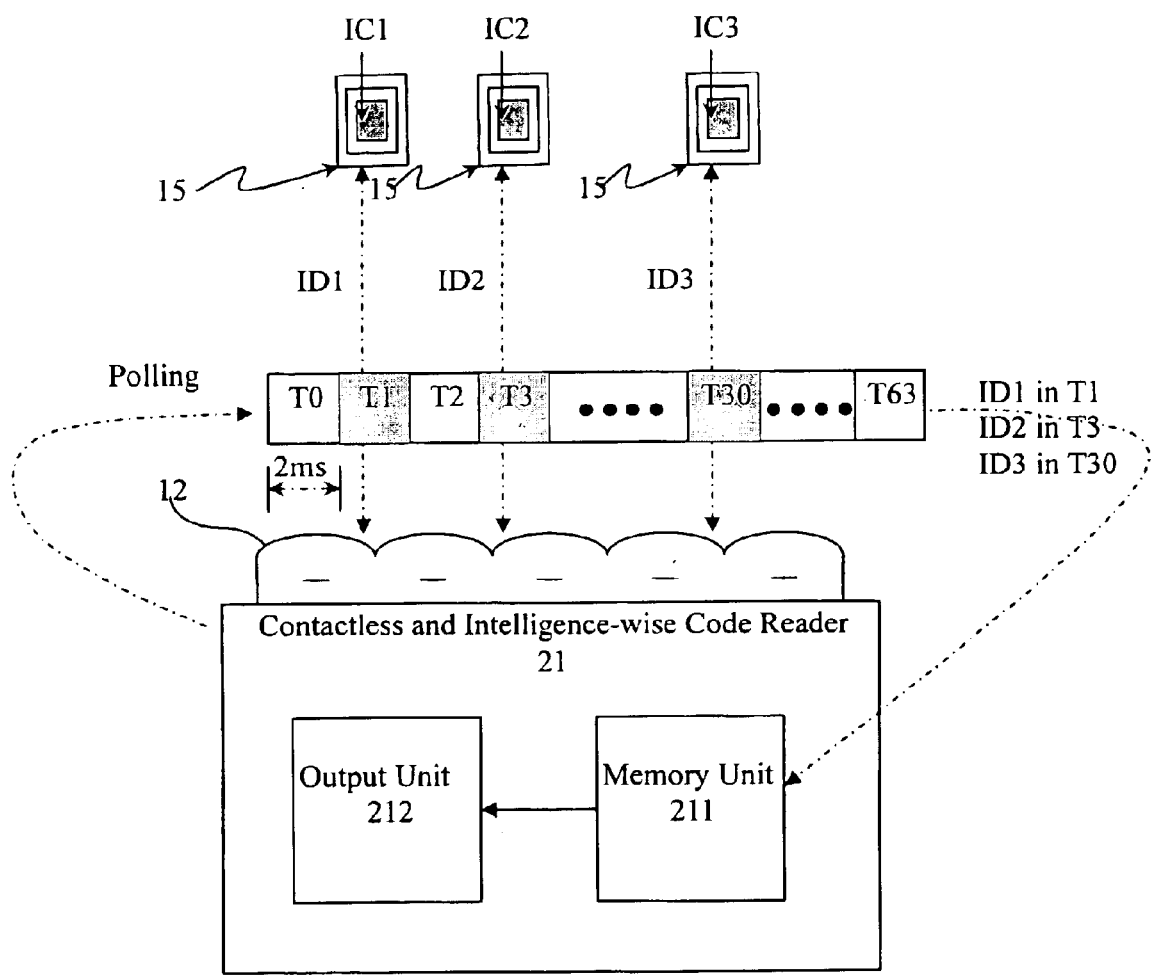
FIG. 2 shows a preferred embodiment of the contactless and intelligence-wise code identification chip system according to the present invention.

FIG. 2 is a preferred embodiment of the contactless and intelligence-wise code identification chip system according to the present invention. As shown in FIG. 2, there are three contactless and intelligence-wise code identification chips IC1, IC2, and IC3 with identification codes ID1, ID2, and ID3 respectively, and they are put into the magnetic field of the induction coil 12 of the contactless and intelligence-wise code reader 21. After IC1, IC2, and IC3 getting energy from the electrical magnetic field, they will randomly generate the random numbers to allocate ID1, ID2, and ID3 into the time slots respectively. In FIG. 2, the random numbers are 1, 3, and 30; therefore the time slots for IC1, IC2, and IC3 are T1, T3, and T30 respectively.

The contactless and intelligence-wise code reader 21 reads every time slot by polling for the identification code. So, in the preferred embodiment, the contactless and intelligence-wise code reader 21 will polling from T0 to T63 (actually, it also may be infinite number); then the reader will get ID1 in T1, ID2 in T3, and ID3 in T30. ID1, ID2 and ID3 will be stored in the memory unit 211 and output by the output unit 212.

Figure 3:
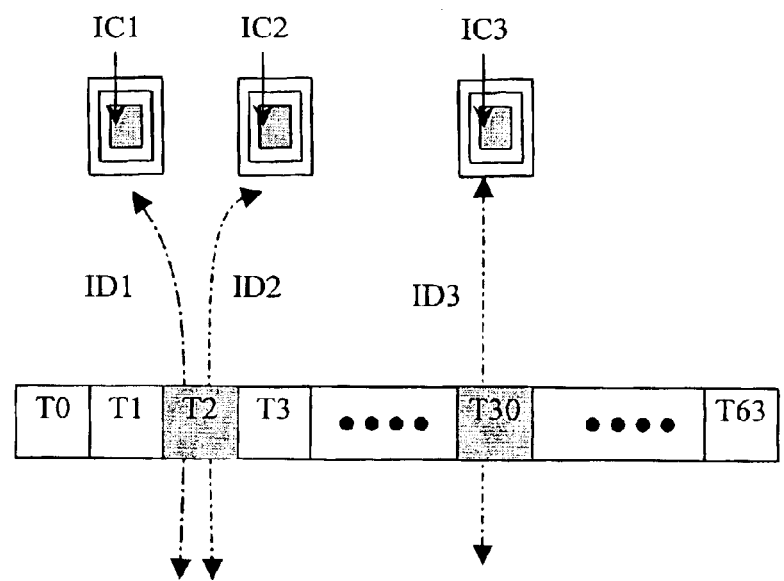
FIG. 3 shows a preferred embodiment of different code chip but generate the same random number.

Because of the random numbers are randomly generated by the contactless and intelligence-wise code identification chips, there would be the same random number generated by the different chips and several identification codes would be allocated in the same time slot. As shown in FIG. 3, IC1 and IC2 generate the same random number. That will lead ID1 and ID2 both to be allocated in T2, and the contactless and intelligence-wise code reader 21 will get ID1 and ID2 concurrently in T2. In order to avoid incorrect code identification, IC1, IC2, and IC3 must re-generate new random numbers for next time slot polling.

Figure 4:
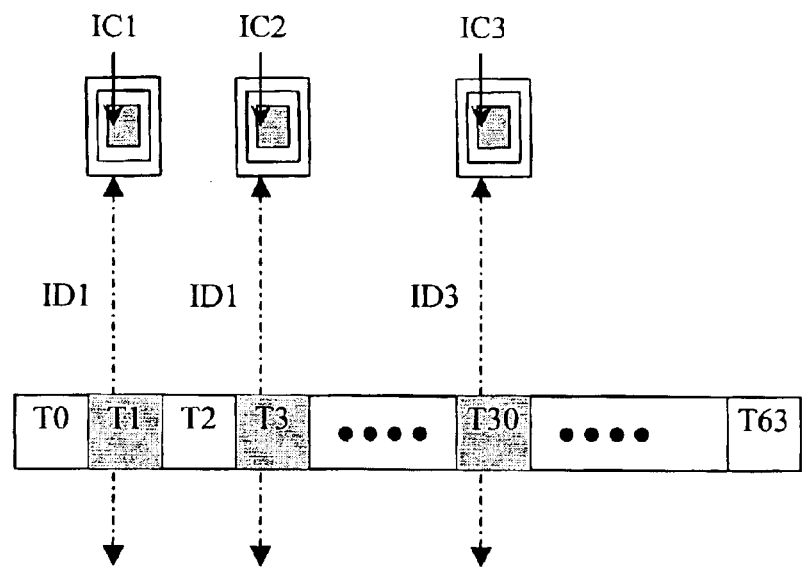
FIG. 4 shows a preferred embodiment of different code chip with the same identification code.

FIG. 4 shows another special case. IC1 and IC2 have the same identification code ID1, but the random numbers are 1 and 3 respectively. So ID1 of IC1 will be allocated in T1, and ID1 of IC2 will be allocated in T3. The contactless and intelligence-wise code reader 21 can easily identify the identification codes by the different time slots.

Further more, if the conditions of FIG. 3 and FIG. 4 happen at the same time, that is, the different chips have the same identification code and be allocated in the same time slot, it will be difficult to identify the identification codes. In order to enhance the exactness and accuracy for the code identification, the code identification method must repeat for one more times until getting the same result, then we can make sure the result is exact.

Considering the cost of manufacturing, the technique of "chip pads coding" can be applied to the present invention. The theory of chip pads coding is based on the third power ($3^x$) extension of each input pad. For example, we may create $3^3=27$ kinds of identification codes with 3 input pads. As well as, the 243 different identification codes can be created with 5 input pads. Above all, these different codes can be created by only one mask when the chips are produced. With this design, the contactless and intelligence-wise code identification chip can be mass-produced with very low cost on the application of identification code.

The present invention is very suitable for the toy development. For example, in the card identification game machine the chips can be implanted into the cards having graphs. So, the reader can identify the cards when children take these cards close to it. Of course, the children may take several cards to the code reader concurrently, and the reader of present invention will not fail. Despite the cards with a different or the same identification codes are taken close to the code reader, the code reader can identify them one by one, and reads out all the names of the graph on the cards.

The present invention is provided to improve the prior art, which can identify the identification codes one by one among several code chips. The ID collision will not happen even though these code chips with the some code. Above all, the accuracy of code identification almost can be 100%, so we can apply the contactless and intelligence-wise code identification chip system to the card identification toys or the supermarket clerks to identify several same or different items concurrently.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims that are to be accorded with the broadest interpretation so as to encompass all such modifications and similar structures.

What is claimed is:

1. A contactless and intelligence-wise code identification chip system, said chip system transferring an identification code by a plurality of time slots and comprising:

a plurality of contactless and intelligence-wise code identification chips including said identification code and being able to generate a random number, said random number being used to select one of said time slots for allocating said identification code; and a contactless and intelligence-wise code reader for reading said identification code from said plurality of time slots by a polling method;

wherein at least two contactless and intelligence-wise code identification chips having the same identification code.

2. The chip system according to claim 1 wherein said contactless and intelligence-wise code identification chip is induced by a magnetic field energy, and transfers said identification code to said contactless and intelligence-wise code reader.

3. The chip system according to claim 1 wherein said random number is an integer among 0 to N, and N is an integer larger than 1.

4. The chip system according to claim 1 wherein an interval of said time slot is 2 ms.

5. The chip system according to claim 1 wherein said contactless and intelligence-wise code reader reads said identification code from said plurality of time slots by said polling method at least once.

6. The chip system according to claim 1 wherein said contactless and intelligence-wise code reader also includes a memory unit to record said time slot and said identification code.

7. The chip system according to claim 6 wherein said contactless and intelligence-wise code reader also includes an output unit to output a content of said memory unit.

8. A method for identifying a contactless and intelligence-wise code identification chip, said method providing a plurality of contactless and intelligence-wise code identification chips to transfer an identification code by a plurality of time slots, and comprising steps of:

generating a random number by said contactless and intelligence-wise code identification chip, said random number being used to select one of time slots for allocating said identification code; and reading said identification code from said plurality of time slots by said contactless code reader with a polling method;

wherein at least two contactless and intelligence-wise code identification chips having the same identification code.

9. The method according to claim 8 wherein said contactless and intelligence-wise code identification chip is induced by a magnetic field energy, and transfers said identification code to said contactless and intelligence-wise code reader.

10. The method according to claim 8 wherein said random number is an integer among 0 to N, and N is an integer larger than 1.

11. The method according to claim 8 wherein the interval of said time slot is 2 ms.

12. The method according to claim 8 wherein said contactless and intelligence-wise code reader reads said identification code from said plurality of time slots by said polling method at least once.

13. The method according to claim 8 wherein the contactless and intelligence-wise code reader also includes a memory unit to record said time slot and said identification code.

14. The method according to claim 13 wherein said contactless and intelligence-wise code reader also includes an output unit to output the content of said memory unit.

* * * * *